United States Patent Office 3,220,045
Patented Nov. 30, 1965

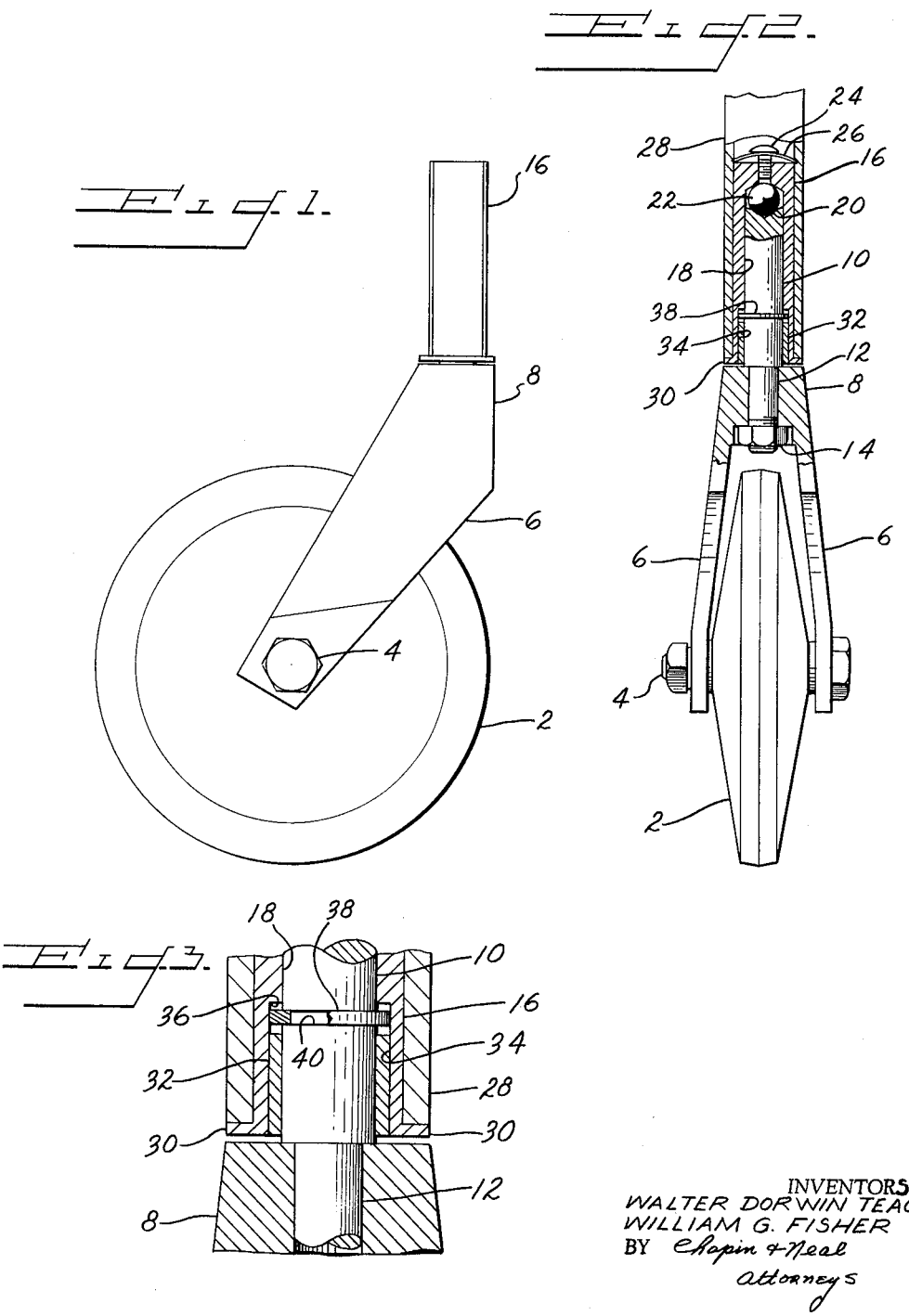

3,220,045
CASTER BEARING ASSEMBLY
Walter Dorwin Teague, Alpine, and William G. Fisher, Hartsdale, N.Y., assignors to United Service Equipment Co., Inc., Palmer, Mass., a corporation of Delaware
Filed May 28, 1964, Ser. No. 370,819
1 Claim. (Cl. 16—43)

This invention relates to caster constructions and more particularly to a bearing assembly for casters of the type having an upstanding pintle stem fixed at the top of the wheel fork and swivelled in a housing which is adapted to be fixed in a leg of a cart or other structure to be supported by casters.

An object of the invention is to provide an inexpensive and simple lower bearing structure for a caster of the type described which can be easily fitted in the housing with the stem and which will require a minimum working of parts and labor in assembly work.

The specific objects and advantages of the invention will be apparent from the following description thereof in conjunction with the accompanying drawings in which;

FIG. 1 is a side elevational view of a type of caster embodying the invention;

FIG. 2 is a front view of the caster of FIG. 1 with the adapter housing shown mounted in a leg member, with parts shown in section; and FIG. 3 is a sectional view on an enlarged scale of the lower bearing structure as shown by FIG. 2.

In FIGS. 1 and 2 the caster wheel is at 2, the wheel axle at 4 being fixed between legs 6 of the wheel fork. The connecting portion 8 of the fork is provided with an upstanding pintle stem 10 fixed therein, the stem being fastened as by a reduced lower stem portion at 12. Portion 12 passes through a vertical opening in portion 8 and the lower end has a nut 14 threaded on it to hold the stem in place.

Stem 10 is rotatably mounted in a socket 18 of the adapter housing 16. At the top of the stem the tip end is angularly recessed as at 20 for a bearing contact with a steel ball 22 located in the upper blind end of the socket.

In the top wall of the housing above the ball is a screw 24 threaded against an umbrella washer 26 which caps the housing. As will be appreciated, the screw is turned against the dished umbrella washer with the edges of the washer projecting beyond the upper edges of the housing. Thus, as the housing is inserted in the hollow leg member 28, the projecting edges of the washer 26 will frictionally slide into the hollow leg until the flanges 30 at the foot of the housing abut against the bottom edges of the leg 28. Any normal attempt to withdraw the housing from the leg in a reverse direction will cause the projecting angled washer edges to bite and grip into the wall of the leg. If the housing is pulled hard enough the washer can be deformed and the caster removed. As is the usual practice, the washer is then replaced so that the caster can be re-used.

As thus far described the arrangement of parts and operation is generally old. The housing 16 is conventionally either cylindrical or rectangular in form. The present invention is directed to the lower bearing structure for the stem and means for retaining the caster stem 10 in the housing 16.

The lower bearing complements the upper bearing provided by the ball 22 and is more clearly shown by FIG. 3. The bearing itself consists of the sleeve 32, preferably of bronze material, fixed in an enlarged lower end of the housing and surrounding stem 10 with a bearing fit. Bearing sleeve 32 is press fitted into the lower end of the housing adjacent its open end, the housing at this lower end being provided with the enlarged bore at 34 and being of slightly greater length than the bearing itself. The inner end of the bearing when fitted in place is spaced from the annular shoulder 36 of the enlarged bore and forms therewith an annular pocket or recess. This pocket is sufficient to accommodate a retaining snap ring 38 which is fitted on stem 10, an annular groove 40 being cut in the stem to receive the ring. Thus the stem 10 with its retaining ring 38 is free to swivel in the housing socket, the upper bearing being provided by the steel ball and the lower bearing being provided by sleeve bearing 32. The ring permits a slight amount of play for good swivelling action and "locks" the stem in the adapter housing against unintentional removal.

The arrangement is simple and effective. Inexpensive stock parts may be used without need for relatively complicated parts or working of the metal pieces. It should be noted particularly that the assembly of the housing and stem is easily accomplished. First, the sleeve 32 is dropped on stem 10. Then ring 38 is snapped into groove 40; the steel ball placed in the socket 18 and, the top of the stem inserted as far as it will go. With a spacer plate (not shown) holding the lower end of the bearing sleeve 32 slightly elevated above the upper wall of the fork portion 8, the housing 16 can then be forced downwardly to receive the bearing with a press or force fit until the flanged foot 30 of the housing abuts the fixture plate of bearing 32. The stem is thus secured from removal by the trapping of the ring 38 between shoulder 36 and the upper end of the bearing.

Having described the invention what is claimed is:

In a swivel caster of the type having an upstanding pintle stem fixed on a wheel fork for rotation therewith and rotatably mounted in an adapter housing having a socket receiving the stem with a ball bearing in the upper inner end of the socket for turning action of the stem and fork relative to said housing; a lower bearing and stem retaining assembly comprising an enlarged bore in the housing socket communicating with the open end thereof and having a shouldered abutment inwardly spaced from said open end, a sleeve bearing rotatably surrounding the stem and fitted in said enlarged bore with a force fit and terminating inwardly at a point spaced from said shouldered abutment, said pintle stem having an annular groove and a snap ring fitted therein with said ring being retained in the annular recess formed between said abutment and said inner end of said bearing.

References Cited by the Examiner
UNITED STATES PATENTS

| | | | |
|---|---|---|---|
| 955,187 | 4/1910 | McNiven | 16—38 |
| 2,134,444 | 10/1938 | Harsh | 16—43 |
| 2,434,863 | 1/1948 | Parkhill | 16—39 |

FOREIGN PATENTS 259,080   6/1949   Switzerland.

JOSEPH D. SEERS, Primary Examiner.
DONLEY J. STOCKING, Examiner.